US012177684B2

(12) United States Patent
Patnaikuni et al.

(10) Patent No.: US 12,177,684 B2
(45) Date of Patent: Dec. 24, 2024

(54) DYNAMIC POSITIONING OF RELAY DEVICES FOR MACHINE-TO-MACHINE WIRELESS COMMUNICATION

(71) Applicant: INTERNATIONAL BUSINESS MACHINES CORPORATION, Armonk, NY (US)

(72) Inventors: Subha Kiran Patnaikuni, Visakhapatnam (IN); Sarbajit K. Rakshit, Kolkata (IN); Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 17/652,503

(22) Filed: Feb. 25, 2022

(65) Prior Publication Data
US 2023/0276250 A1    Aug. 31, 2023

(51) Int. Cl.
*H04W 16/18*    (2009.01)
*G01S 5/00*    (2006.01)
(Continued)

(52) U.S. Cl.
CPC ........... *H04W 16/18* (2013.01); *G01S 5/0027* (2013.01); *H04W 4/70* (2018.02); *H04W 84/18* (2013.01)

(58) Field of Classification Search
CPC ....... H04W 16/18; H04W 4/70; H04W 84/18; G01S 5/0027
(Continued)

(56) References Cited

U.S. PATENT DOCUMENTS 6,246,883 B1 * 6/2001 Lee .................. H04W 4/02
340/870.11
9,456,361 B1 * 9/2016 Levy .................... G08G 5/0013
(Continued)

FOREIGN PATENT DOCUMENTS

WO    WO-2016064700 A2 *    4/2016    ............. B64D 47/08
WO        2018036570 A1      3/2018
(Continued)

OTHER PUBLICATIONS

Alsharoa et al., "UAV-Direct: Facilitating D2D Communications for Dynamic and Infrastructure-less Networking," DroNet'18, Jun. 10-15, 2018, ACM, https://doi.org/10.1145/3213526.3213537, pp. 57-62.
(Continued)

*Primary Examiner* — Anthony Mejia
(74) *Attorney, Agent, or Firm* — Anthony M. Pallone

(57) ABSTRACT

According to one embodiment, a method, computer system, and computer program product for wireless network communication. The embodiment may include identifying a workflow among multiple industrial machines within an activity area. Performance of the workflow requires wireless communication among the multiple industrial machines. The embodiment may include identifying communication requirements and communication capabilities of the multiple industrial machines. In response to determining a wireless network is not available within the activity area, the embodiment may include deploying one or more relay computing devices to deployment locations within the activity area based on the workflow, the communication requirements, and the communication capabilities. The embodiment may include instructing the one or more relay computing devices to create a wireless network which
(Continued)

enables wireless communication among the multiple industrial machines.

20 Claims, 6 Drawing Sheets

(51) Int. Cl.
*H04W 4/70* (2018.01)
*H04W 84/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 9,866,313 | B1* | 1/2018 | Murphy | G08G 5/0091 |
| 11,601,613 | B1* | 3/2023 | Clark | H04N 7/152 |
| 11,758,577 | B2* | 9/2023 | Fanelli | G08G 5/0013 |
| | | | | 370/329 |
| 11,996,900 | B2* | 5/2024 | Cella | H04B 17/318 |
| 2015/0063202 | A1* | 3/2015 | Mazzarella | H04L 65/1093 |
| | | | | 370/316 |
| 2016/0275801 | A1* | 9/2016 | Kopardekar | G08G 5/0082 |
| 2017/0350959 | A1* | 12/2017 | Yaqub | G01S 3/40 |
| 2020/0317339 | A1 | 10/2020 | Ju | |
| 2021/0088337 | A1* | 3/2021 | Koubaa | G01C 21/20 |
| 2021/0316858 | A1* | 10/2021 | Pargoe | B64U 10/14 |
| 2022/0377519 | A1* | 11/2022 | Lei | H04W 4/029 |
| 2023/0188959 | A1* | 6/2023 | Lekutai | H04W 4/40 |
| | | | | 370/329 |
| 2023/0337329 | A1* | 10/2023 | Kanitkar | H04W 16/18 |
| 2024/0146396 | A1* | 5/2024 | Wu | H04B 7/18504 |
| 2024/0154711 | A1* | 5/2024 | Hu | H04N 13/398 |

FOREIGN PATENT DOCUMENTS

| | | | | |
|---|---|---|---|---|
| WO | WO-2020056125 A1 * | 3/2020 | | B64C 39/024 |
| WO | WO-2022187198 A1 * | 9/2022 | | G06F 16/29 |

OTHER PUBLICATIONS

Jiang et al., "Dynamic UAV Relay Positioning for the Ground-to-Air Uplink," IEEE Globecom 2010 Workshop on Wireless Networking for Unmanned Aerial Vehicles, IEEE, 2010, pp. 1766-1770.

Li et al., "UAV-Assisted Dynamic Coverage in a Heterogeneous Cellular System," IEEE Network, Jul./Aug. 2017, https://doi.org/10.1109/MNET.2017.1600280, pp. 56-61.

Mell et al., "The NIST Definition of Cloud Computing", National Institute of Standards and Technology, Special Publication 800-145, Sep. 2011, 7 pages.

Oliveira et al., "Machine Learning for the Dynamic Positioning of UAVs for Extended Connectivity," Sensors 2021, 21, 4618. https://doi.org/10.3390/s21134618, Published Jul. 5, 2021, 22 pages.

* cited by examiner

DYNAMIC POSITIONING OF RELAY DEVICES FOR MACHINE-TO-MACHINE WIRELESS COMMUNICATION

BACKGROUND

The present invention relates generally to the field of computing, and more particularly to wireless network communication.

A wireless network is a computer network that uses wireless data connections between network nodes, thus enabling the transmission of information (i.e., data) over a distance without the use of wires or cables. The network nodes may be a variety of electronic devices that are connected to a wireless network and capable of creating, receiving, or transmitting information over a communication channel. Wireless networks are generally realized and administrated using radio communication implemented at the physical layer of the Open Systems Interconnection (OSI) model. Examples of wireless networks include a wireless personal area network (WPAN), a wireless local area network (WLAN), a wireless ad hoc network (i.e., a mesh network), a wireless metropolitan area network (WMAN), a wireless wide area network (WWAN), and a cellular network.

SUMMARY

According to one embodiment, a method, computer system, and computer program product for wireless network communication. The embodiment may include identifying a workflow among multiple industrial machines within an activity area. Performance of the workflow requires wireless communication among the multiple industrial machines. The embodiment may include identifying communication requirements and communication capabilities of the multiple industrial machines. In response to determining a wireless network is not available within the activity area, the embodiment may include deploying one or more relay computing devices to deployment locations within the activity area based on the workflow, the communication requirements, and the communication capabilities. The embodiment may include instructing the one or more relay computing devices to create a wireless network which enables wireless communication among the multiple industrial machines.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
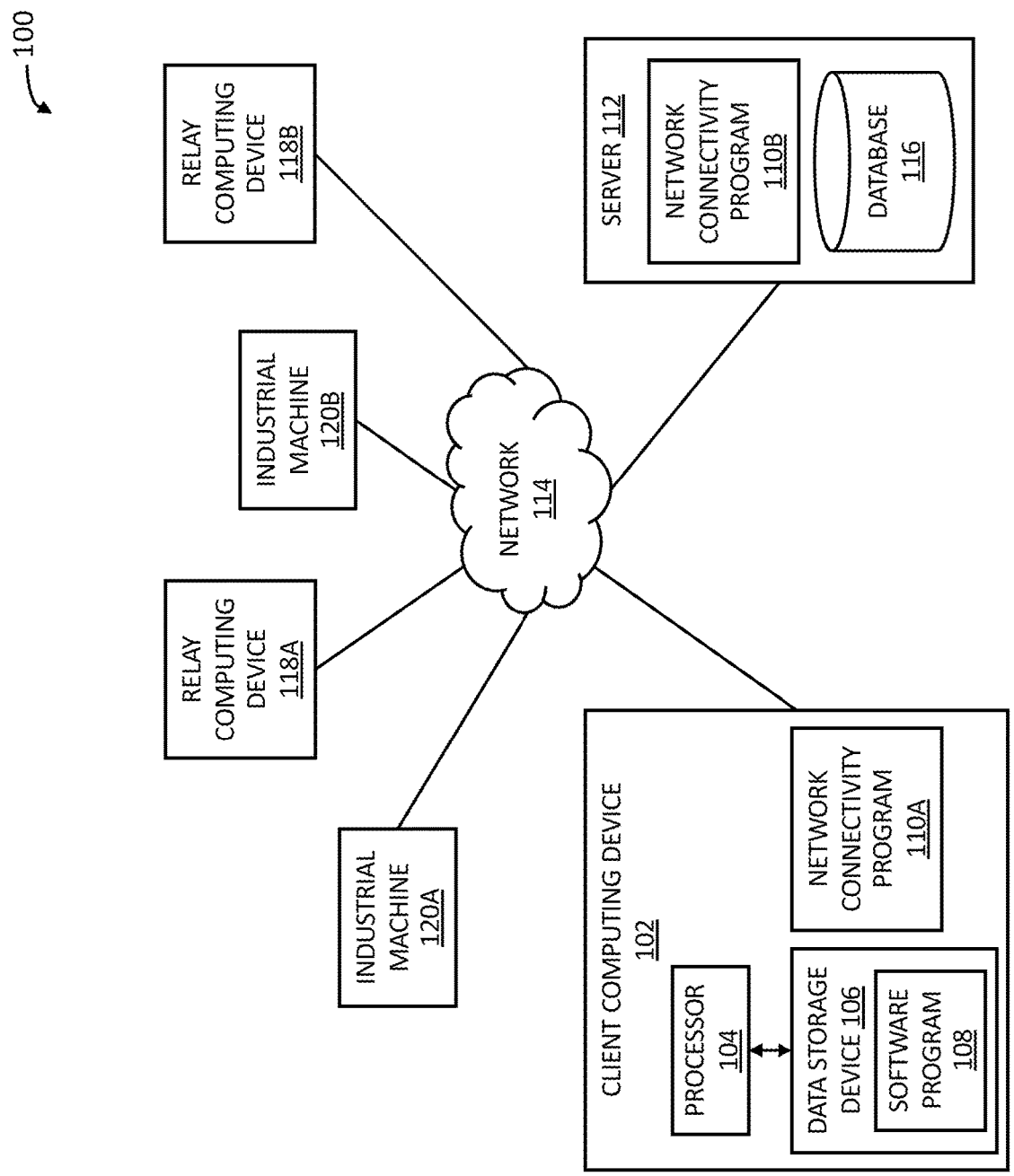
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to wireless network communication. The following described exemplary embodiments provide a system, method, and program product to, among other things, identify a wireless internet connectivity requirement among multiple industrial machines to collaboratively perform some workflow (e.g., task, operation) in an environment and accordingly, create, via one or more mobile relay devices, a wireless internet communication network among the multiple industrial machines to enable performance of the workflow. Therefore, the present embodiment has the capacity to improve the technical field of wireless network communication by dynamically establishing wireless internet communication capability among disconnected machines, thus providing machine-to-machine communication and facilitating a collaborative workflow.

As previously described, a wireless network is a computer network that uses wireless data connections between network nodes, thus enabling the transmission of information (i.e., data) over a distance without the use of wires or cables. The network nodes may be a variety of electronic devices that are connected to a wireless network and capable of creating, receiving, or transmitting information over a communication channel. Wireless networks are generally realized and administrated using radio communication implemented at the physical layer of the OSI model. Examples of wireless networks include a WPAN, a WLAN, a wireless ad hoc network (i.e., a mesh network), a WMAN, a WWAN, and a cellular network. As wireless network communication involves transfer of information without any physical connection between two or more points, enterprises and government agencies may avoid the costly process of introducing a physical infrastructure (e.g., running cables) and subsequent maintenance practice. Moreover, the use of a wireless network may enable internet connectivity and communication among devices or machines in an environment where such connectivity and communication are not available via a physical infrastructure and is required to ensure a collaborative workflow among the devices or machines.

For example, in a geographically remote area where physical infrastructure supporting internet connectivity does not exist and the laying of cables is not feasible, or in a disaster area where physical infrastructure supporting internet connectivity has been damaged or lost, a wireless network facilitating internet connectivity and communication among machines and devices, in use in such areas to perform some collaborative operation, may ensure an uninterrupted operation among those machines and devices. Consider the scenario of a disaster area in which an internet outage prevents machine-to-machine connectivity/communication while those machines (e.g., mobile medical units, industrial earth moving machines) are attempting to perform some rescue or disaster mitigation operation in a collaborative manner. The connectivity among the machines may depend on technological capabilities (e.g., communication range) of the machines as well as distances between the machines. However, if the distance between the machines is too great (e.g., exceeds a communication range of a machine), then machine-to-machine communication may not be possible and consequently collaborative performance of the rescue or disaster mitigation operation may also not be possible.

It may therefore be imperative to have a system in place to relay machine-to-machine communications by proactively placing one or more mobile relay devices among the machines such that the one or more mobile relay devices create a wireless network which enables internet connectivity and communication among the machines. Thus, embodiments of the present invention may be advantageous to, among other things, deploy one or more mobile relay devices to positions in proximity of the multiple machines to create a wireless communication network among the multiple machines. The present invention does not require that all advantages need to be incorporated into every embodiment of the invention.

According to at least one embodiment, a collaborative workflow sequence among a multi-machine ecosystem may be identified based on contextual analysis of an environment of the ecosystem and information of the machines within the ecosystem. For each machine within the ecosystem, connectivity/communication capabilities as well as requirements, based on the identified workflow, may be identified. Furthermore, an activity area associated with the workflow, positions of machines within the activity area, and distances between machines within the activity area may be identified. In response to a determination of a lack of internet connectivity among the machines within the activity area, one or more drone-like flying relay devices may be deployed to the activity area and positioned among the machines based on their relative positions. The one or more relay devices may create a wireless network which enables internet connectivity and communication among the machines in the activity area.

According to at least one further embodiment, an amount of available network bandwidth of the wireless network created by the one or more relay devices may be based on an estimated volume of data transmission among the machines within the activity area. According to at least one further embodiment, the one or more drone-like flying relay devices may be repositioned based on changes in the relative positions of the machines within the activity area. According to another embodiment, the one or more drone-like flying relay devices may be repositioned based on changes in data transfer rates among the machines within the activity area. According to yet another embodiment, the one or more drone-like flying relay devices may be repositioned based on a priority of machine-to-machine communication within the activity area.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify multiple industrial machines requiring wireless internet connectivity among them in order to collaboratively perform a workflow within an activity area and, accordingly, deploy one or more relay devices within the activity area to provide internet connectivity and create a wireless communication network among the industrial machines to facilitate performance of the workflow.

Referring to FIG. 1, an exemplary networked computer environment 100 is depicted, according to at least one embodiment. The networked computer environment 100 may include a client computing device 102, a server 112, industrial machines 120A, 120B, and relay computing devices 118A, 118B interconnected via a communication network 114. According to at least one implementation, the networked computer environment 100 may include a plurality of client computing devices 102 and servers 112, of which only one of each is shown for illustrative brevity. Moreover, in one or more embodiments, the networked computer environment 100 may include at least one relay computing device 118A, 118b and at least two industrial machines 120A, 120B. Additionally, in one or more embodiments, the client computing device 102 and the server 112 may each host a network connectivity (NC) program 110A, 110B, respectively. In one or more other embodiments, the NC program 110A, 110B may be partially hosted on client computing device 102 and server 112 so that functionality may be separated among the devices. In one or more further embodiments, the NC program 110A, 110B may also be partially hosted within industrial machines 120A, 120B, and relay computing devices 118A, 118B so that functionality may be separated among the devices.

The communication network 114 may include various types of communication networks, such as a personal area network (PAN), wide area network (WAN), local area network (LAN), a telecommunication network, a wireless network, a wireless ad hoc network (i.e., a wireless mesh network), a public switched network, and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a NC program 110A and communicate with the server 112, relay computing devices 118A, 118B, and industrial machines 120A, 120B via the communication network 114, in accordance with embodiments of the invention. Client computing device 102 may be, for example, a mobile device, a smartphone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a NC program 110B and a database 116 and communicating with the client computing device 102, relay computing devices 118A, 118B, and industrial machines 120A, 120B via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Relay computing devices 118A, 118B may be any Internet-of-Things (IoT) enabled computing device known in the art for providing an access point for internet connection, capable of connecting to the communication network 114, and transmitting and receiving data with the client computing device 102, the server 112, and the industrial machines 120A, 120B. In one or more embodiments, the relay computing devices 118A, 118B may be integrated within a known mobile autonomous vehicle such as a networked flying platform (e.g., drone, unmanned aerial vehicle), a walking robot, an autonomous tracked vehicle, or an autonomous wheeled vehicle. Furthermore, in one or more embodiments, relay computing devices 118A, 118B may include a processor, a memory, and network adapters or interfaces such as a TCP/IP adapter cards, wireless Wi-Fi interface cards, or 3G or 4G wireless interface cards or other wired or wireless communication links. Additionally, in embodiments of the invention, one or more relay computing devices 118A, 118B may serve as a wireless mesh network (e.g., network 114) providing internet access to, and wireless communication among, two or more industrial machines 120A, 120B.

Industrial machines 120A, 120B may be IoT enabled industrial machines working collaboratively to perform some workflow that are capable of connecting to the communication network 114 and transmitting and receiving data among each other as well as with the client computing device 102, the server 112, and the relay computing devices 118A, 118B. In one or more embodiments, the industrial machines 120A, 120B may be mobile. For example, the industrial machines 120A, 120B may be mobile earth moving machines (e.g., excavators, bulldozers, cranes, dump trucks) or mobile medical units (e.g., ambulances). Furthermore, in one or more embodiments, the industrial machines 120A, 120B may include a processor, a memory, wireless network communication capability (e.g., WiFi, Bluetooth, satellite), and Global Positioning System (GPS) capability. According to at least one embodiment, the industrial machines 120A, 120B may connect to the internet and communicate with each other via the network 114 implemented by the relay computing devices 118A, 118B.

According to the present embodiment, the NC program 110A, 110B may be a program capable of identifying a collaborative workflow requiring wireless connectivity among multiple industrial machines within an activity area, identifying bounds of the activity area and GPS locations of the multiple industrial machines contained therein, determining whether wireless internet connectivity and communication is present among the industrial machines, identifying communication requirements and wireless communication capabilities of the industrial machines as well as distances between the industrial machines, deploying one or more mobile network relay devices within the activity area to provide wireless internet connectivity and communication among the industrial machines, and repositioning the one or more mobile network relay devices in response to changes in positions of one or more industrial machines or in response to changes in communication requirements of one or more industrial machines, or both. In at least one embodiment, the NC program 110A, 110B may require a user to opt-in to system usage upon opening or installation of the NC program 110A, 110B. The NC method is explained in further detail below with respect to FIG. 3.

Figure 2:
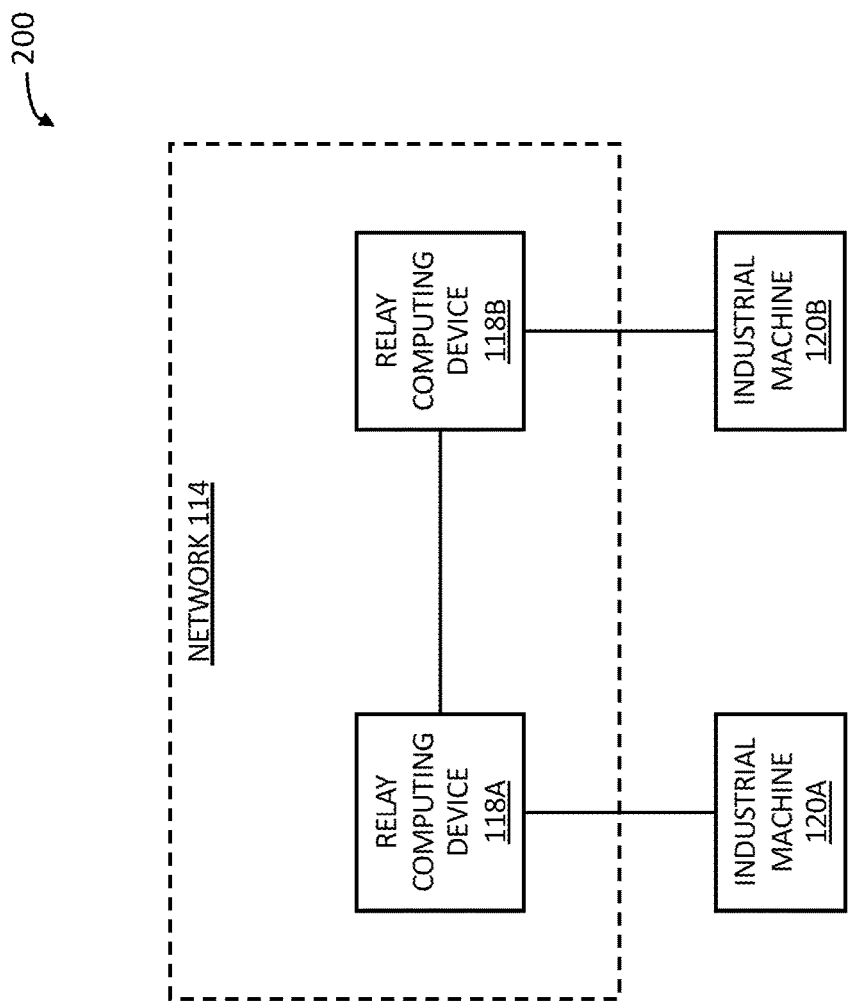
FIG. 2 illustrates a block diagram of an exemplary networked industrial machine environment using relay devices according to at least one embodiment.

Referring now to FIG. 2, an exemplary networked industrial machine environment 200 using relay devices is depicted, according to at least one embodiment. The networked industrial machine environment 200 may include the industrial machines 120A, 120B and the relay computing devices 118A, 118B of FIG. 1. According to at least one implementation, the industrial machine 120A may be wirelessly connected to the relay computing device 118A, the industrial machine 120B may be wirelessly connected to the relay computing device 118B, and the relay computing devices 118A, 118B may be wirelessly connected to each other. Moreover, according to at least one embodiment, the relay computing devices 118A, 118B may comprise an example implementation the network 114 of FIG. 1. Consequently, the industrial machines 120A, 120B may communicate with each other via the network 114 implemented by the relay computing devices 118A, 118B. Although environment 200 depicts relay computing devices 118A, 118B as implementing the network 114, in other embodiments, one or more relay computing devices 118A, 118B may implement the network 114 for connectivity among two or more industrial machines 120A, 120B.

Figure 3:
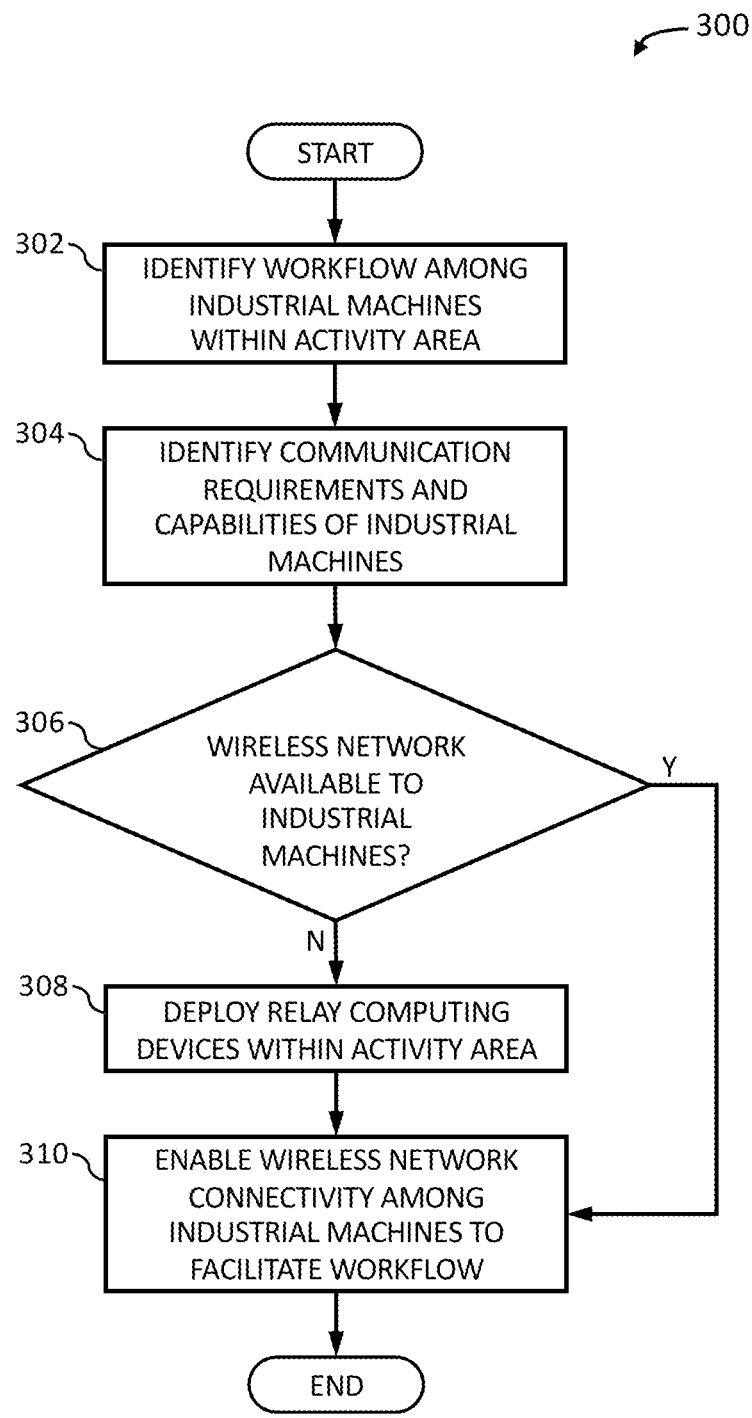
FIG. 3 illustrates an operational flowchart for enabling wireless network communication in a wireless network creation process according to at least one embodiment.

Referring now to FIG. 3, an operational flowchart for enabling wireless network connectivity and communication in a wireless network creation process 300 is depicted according to at least one embodiment. At 302, the NC program 110A, 110B identifies a collaborative workflow to be performed by multiple industrial machines (e.g., industrial machines 120A, 120B) within an activity area. Identification of the workflow may include identification of a sequence of one or more activities to be performed in collaboration by the multiple industrial machines and therefore requiring connectivity and communication among the industrial machines. According to at least one embodiment, identification of the workflow may be based on a contextual analysis of an environment of the activity area. For example, contextual analysis may indicate that an activity area is within a construction zone environment or within an environment affected by some disaster. As such, example workflow activities may include collaborative earth moving operations (e.g., excavation and hauling away of material) or collaborative rescue operations (e.g., providing person extraction and medical assistance) to be performed by industrial machines according to a sequence. The NC program 110A, 110B may receive contextual information of an environment from another software program (e.g., software program 108). Identification of the workflow may be further based on historical learning from contextual analysis of similar environments, stored within data storage device 106 or database 116, as well as information gathered from one or more of the industrial machines within the activity area.

Additionally, at 302, as part of identifying the workflow to be performed within the activity area, the NC program 110A, 110B may identify the geographical bounds of the activity area. Furthermore, the NC program 110A, 110B may, based on the contextual analysis of the activity area, identify the industrial machines which will be required to perform the workflow and the types of collaborative activities to be performed by the industrial machines. In other words, the NC program 110A, 110B may identify how different industrial machines will collaboratively participate in the workflow (i.e., identify functions/roles of industrial machines). Profile information of each industrial machine, including a machine type and technical capabilities, may be stored within data storage device 106 or database 116 and accessed by the NC program 110A, 110B when identifying how different industrial machines will collaboratively participate in the workflow. The profile information of the industrial machines may be input by a system administrator or received from the industrial machines.

Next, at 304, the NC program 110A, 110B identifies communication requirements and communication capabilities of the identified industrial machines required to perform the collaborative workflow. The communication requirements may be based on the contextual analysis of the activity area and the identified workflow. As the workflow requires that the industrial machines collaborate with each other to perform one or more activities, machine-to-machine communication may be required. For example, while performing one or more activities of the workflow, one industrial machine may need to transfer generated data to one or more other industrial machines which may process the generated data in furtherance of the workflow. As an illustration, consider a workflow in the context of a construction site in which an excavator unearths an amount of dirt which needs to be hauled away by a dump truck. In furtherance of this example workflow, the excavator may need to communicate the amount of unearthed dirt to the dump truck so that it may determine if it has the necessary capacity and proceed to the location of the excavator and haul away the dirt. Given the collaborative nature of the workflow to be performed, communication requirements of an industrial machine may include identification of one or more other industrial machines with which connectivity and communication is required, as well as estimated volumes of data transmission.

With continued reference to 304, the NC program 110A, 110B may base the communication capabilities of identified industrial machines on respective profile information containing technical capabilities. For example, technical capabilities of an industrial machine may specify an available wireless network communication capability (e.g., WiFi, Bluetooth, satellite), a range of wireless network communication, and a GPS capability. Furthermore, at 304, the NC program 110A, 110B may identify geographic positions of identified industrial machines, via their respective GPS capabilities, and distances between the identified industrial machines based on their respective identified geographic locations.

At 306, the NC program 110A, 110B determines whether or not a wireless network is available within the activity area to enable connectivity and communication among the identified industrial machines. As described above, machine-to-machine communication may be required among the industrial machines in order to facilitate performance of the identified workflow. As such, if a wireless network is not available within the activity area, the industrial machines may not be in communication with each other, and performance of the workflow may be thwarted. In response to determining that a wireless network is available to enable connectivity and communication among the identified industrial machines (step 306, "Y" branch), the wireless network creation process 300 may proceed to step 310. In response to determining that a wireless network is not available to enable connectivity and communication among the identified industrial machines (step 306, "N" branch), the wireless network creation process 300 may proceed to step 308.

Next, at 308, the NC program 110A, 110B identifies and deploys one or more available relay computing devices (e.g., relay computing devices 118A, 118B) to locations within the activity area. The deployment locations of the one or more relay computing devices may be based on the identified collaborative workflow, the identified communication requirements and capabilities of the industrial machines, the identified geographic positions of the industrial machines, and the identified distances between the industrial machines such that one or more relay computing devices at one or more deployment locations facilitates the required machine-to-machine communication among two or more industrial machines. For example, an identified workflow and identified communication requirements of a first industrial machine may indicate that data transmission to a second industrial machine is required to perform the workflow. However, identified communication capabilities of the first industrial machine and an identified distance between the first and the second industrial machine may also indicate that the first industrial machine is not within communication range of the second industrial machine, and thus cannot perform the workflow. In such an example, the NC program 110A, 110B may identify one or more deployment locations relative to the geographic positions of the first and the second industrial machines such that one or more relay computing devices in those one or more deployment locations are able to receive data transmission from the first industrial machine and relay it to the second industrial machine, thus facilitating the workflow. The NC program 110A, 110B, may then deploy one or more relay computing devices to the identified deployment locations. It should be noted that a deployment location may include GPS coordinates and may also include a specified altitude.

According to at least one further embodiment, the NC program 110A, 110B may additionally utilize the least-squares method when deploying the one or more available relay computing devices (e.g., relay computing devices 118A, 118B) to locations within the activity area. The least-squares method is a known form of mathematical regression analysis used to determine the line of best fit for a set of data points, providing a visual demonstration of the relationship between the data points. In the context of the present invention, the set of data points may represent the geographic positions of the industrial machines (e.g., industrial machines 120A, 120B), and the line of best fit may represent a path of one or more deployment locations for the one or more relay computing devices.

According to at least one further embodiment, the number of available relay computing devices (e.g., relay computing devices 118A, 118B) identified for deployment to locations within the activity area may be based on an estimated volume of data transmission from one industrial machine to another industrial machine (e.g., industrial machines 120A, 120B). The network bandwidth available for machine-to-machine communication may increase as the number of deployed relay computing devices increases. As such, based on an estimated volume of data transmission resulting from machine-to-machine communication, the NC program 110A, 110B may identify an amount of wireless network bandwidth to be created and, accordingly, deploy a number of relay computing devices to achieve the identified amount of wireless network bandwidth.

According to at least one further embodiment, the NC program 110A, 110B may identify an available relay computing device as a pilot relay computing device. The NC program 110A, 110B may direct the pilot relay computing device to move from one industrial machine to another within the activity area in order to identify and gather communication requirements of one or more industrial machines. The NC program 110A, 110B may then base deployment of the one or more available relay computing devices to locations within the activity area on analysis of the gathered information of identified communication requirements.

According to at least one further embodiment, the NC program 110A, 110B may dynamically reposition the one or more available relay computing devices to different deployment locations within the activity area in response to changes to one or more geographic positions of the industrial machines in order to maintain machine-to-machine communication as required by an identified workflow and identified communication requirements. Furthermore, in order to ensure continued required machine-to-machine communication, the NC program 110A, 110B may also dynamically reposition the one or more available relay computing devices to different deployment locations within the activity area in response to any one or combination of, changes in data transfer rate among one or more identified industrial machines, a priority of machine-to-machine communication among identified industrial machines (e.g., communications of a particular industrial machine within the activity area may be prioritized over communications of other industrial machines within the activity area, and a change in an identified workflow (e.g., a change in the sequence of activities sequence or a change in industrial machine operation).

At 310, the NC program 110A, 110B instructs the deployed one or more available relay computing devices to enable wireless network connectivity and communication among the identified industrial machines and subsequently facilitates performance of the identified workflow. The one or more available relay computing devices may act as access points for an internet connection (e.g., create a mesh network) which the identified industrial machines may utilize to communicate among each other according to their respective communication requirements and thus execute the sequence of activities of the identified workflow.

It may be appreciated that FIG. 2 and FIG. 3 provide only an illustration of one implementation and do not imply any limitations with regard to how different embodiments may be implemented. Many modifications to the depicted environments may be made based on design and implementation requirements.

Figure 4:
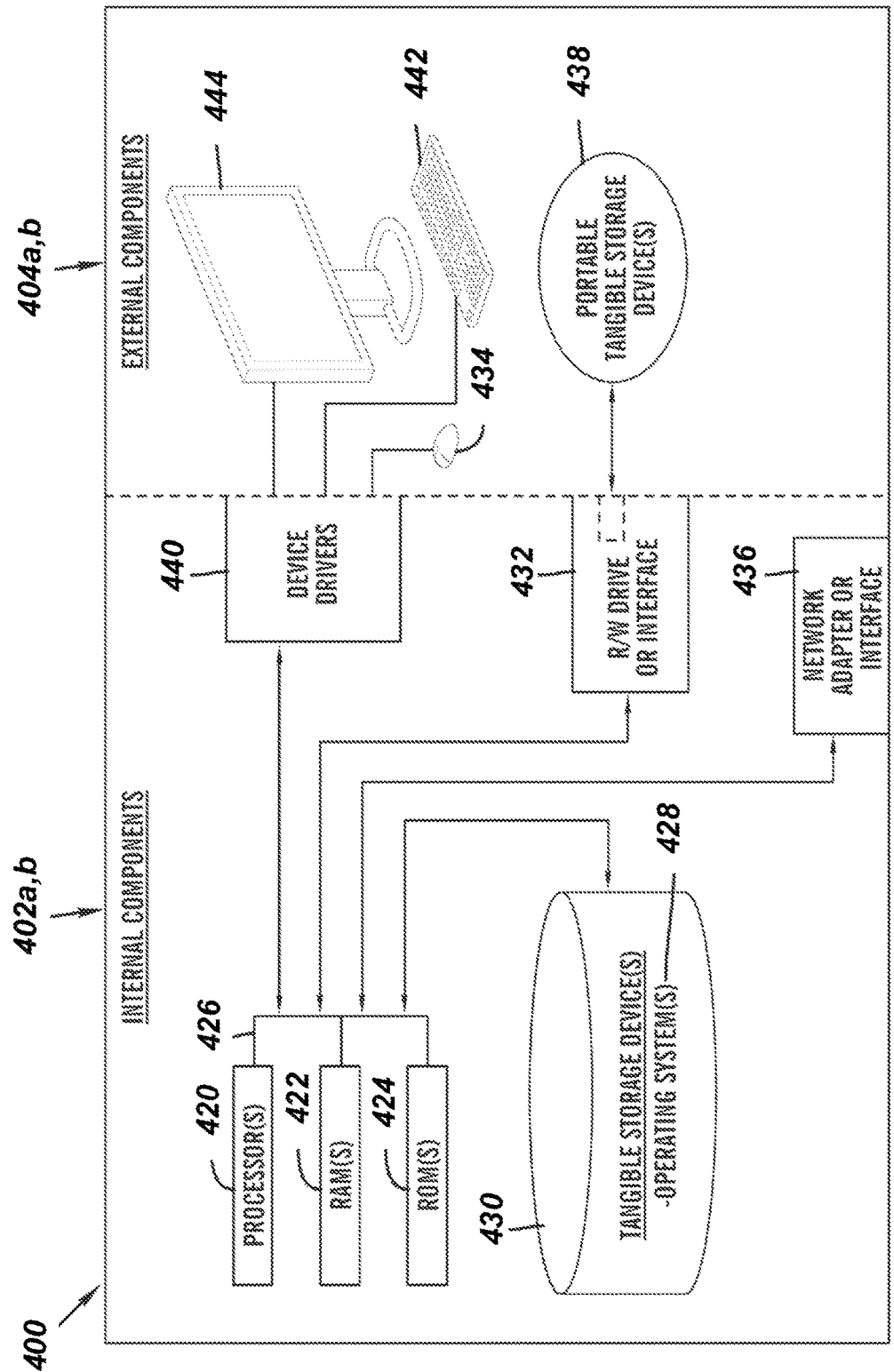
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the NC program 110A in the client computing device 102, and the NC program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the NC program 110A, 110B can be stored on one or more of the respective portable computer-readable tangible storage devices 438, read via the respective RAY drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the NC program 110A in the client computing device 102, and the NC program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the NC program 110A in the client computing device 102, and the NC program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
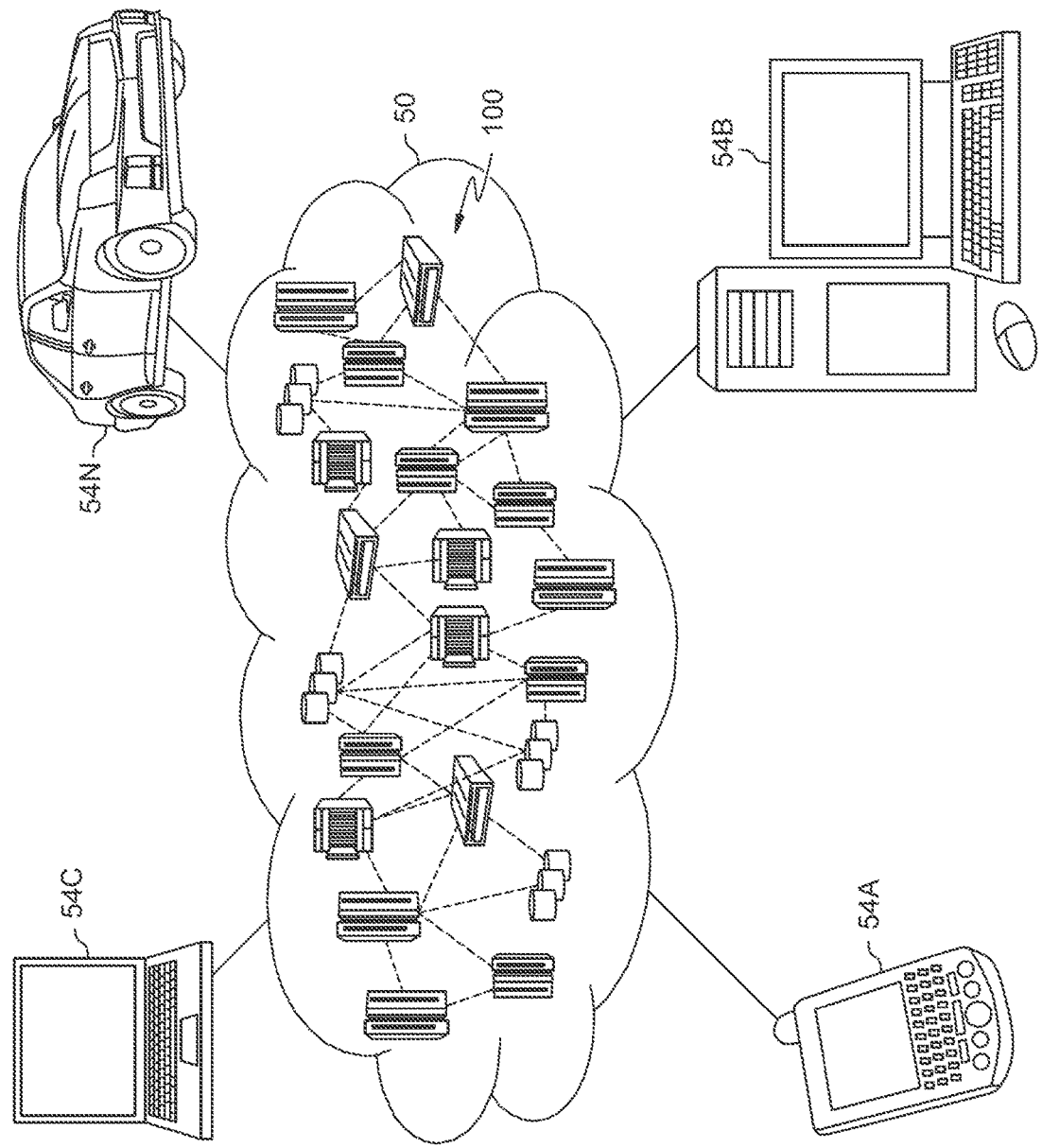
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
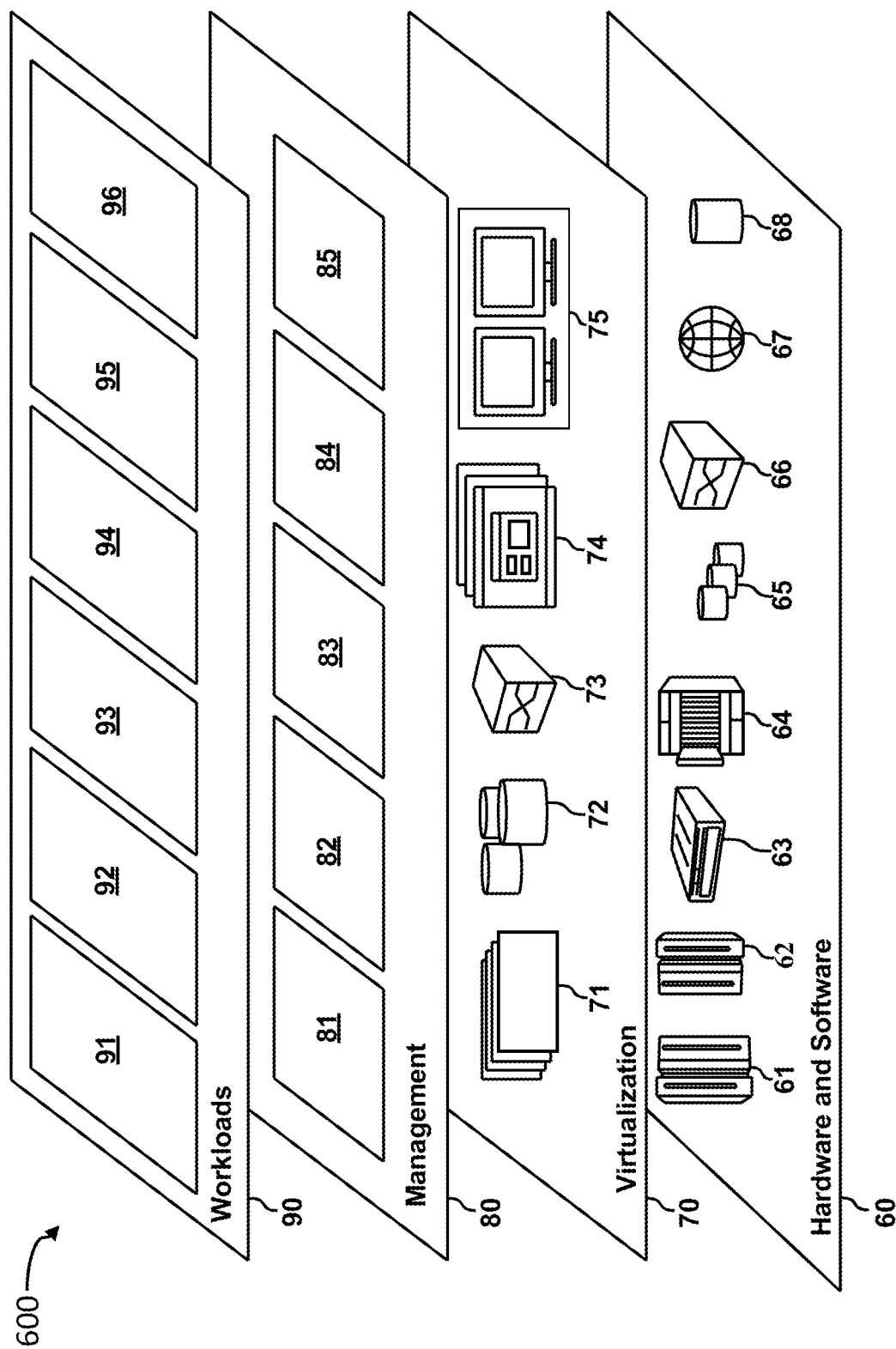
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wireless network creation 96. Wireless network creation 96 may relate to creation of a wireless network enabling connectivity and communication among multiple industrial machines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
identifying a workflow among multiple industrial machines within an activity area, wherein performance of the workflow requires wireless communication among the multiple industrial machines;
identifying communication requirements and communication capabilities of the multiple industrial machines;
in response to determining a wireless network is not available within the activity area, deploying one or more relay computing devices to deployment locations within the activity area based on the workflow, the communication requirements, and the communication capabilities; and
instructing the one or more relay computing devices to create a wireless network which enables wireless communication among the multiple industrial machines, wherein an amount of available bandwidth of the wireless network is based on an estimated volume of data transmission among the multiple industrial machines.

2. The method of claim 1, wherein the workflow comprises a sequence of activities to be performed in collaboration by the multiple industrial machines and roles of the multiple industrial machines, and wherein identification of the workflow is based on a contextual analysis of an environment of the activity area.

3. The method of claim 2, wherein identification of the communication requirements of the multiple industrial machines is based on the contextual analysis and the identified workflow, and wherein communication requirements of an industrial machine, of the multiple industrial machines, comprises identification of one or more other industrial machines, of the multiple industrial machines, with which communication is required and an estimated volume of data transmission.

4. The method of claim 1, wherein the communication capabilities of the multiple industrial machines comprise wireless network communication capabilities of each of the multiple industrial machines, ranges of wireless network communication of each of the multiple industrial machines, geographic positions of each of the multiple industrial machines, and distances between the multiple industrial machines.

5. The method of claim 1, further comprising:
identifying a change to one or more geographic positions of the multiple industrial machines; and
redeploying the one or more relay computing devices to different deployment locations within the activity area based on the identified change to one or more geographic positions of the multiple industrial machines.

6. The method of claim 1, further comprising:
identifying a change in the workflow; and
redeploying the one or more relay computing devices to different deployment locations within the activity area based on the identified change in the workflow.

7. The method of claim 1, further comprising:
identifying changes in data transfer rate among one or more of the multiple industrial machines;
identifying a priority of machine-to-machine communication among the multiple industrial machines; and
redeploying the one or more relay computing devices to different deployment locations within the activity area based on at least one of the identified changes in data transfer rate and the identified priority of machine-to-machine communication.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying a workflow among multiple industrial machines within an activity area, wherein performance of the workflow requires wireless communication among the multiple industrial machines;
identifying communication requirements and communication capabilities of the multiple industrial machines;
in response to determining a wireless network is not available within the activity area, deploying one or more relay computing devices to deployment locations within the activity area based on the workflow, the communication requirements, and the communication capabilities; and instructing the one or more relay computing devices to create a wireless network which enables wireless communication among the multiple industrial machines, wherein an amount of available bandwidth of the wireless network is based on an estimated volume of data transmission among the multiple industrial machines.

9. The computer system of claim 8, wherein the workflow comprises a sequence of activities to be performed in collaboration by the multiple industrial machines and roles of the multiple industrial machines, and wherein identification of the workflow is based on a contextual analysis of an environment of the activity area.

10. The computer system of claim 9, wherein identification of the communication requirements of the multiple industrial machines is based on the contextual analysis and the identified workflow, and wherein communication requirements of an industrial machine, of the multiple industrial machines, comprises identification of one or more other industrial machines, of the multiple industrial machines, with which communication is required and an estimated volume of data transmission.

11. The computer system of claim 8, wherein the communication capabilities of the multiple industrial machines comprise wireless network communication capabilities of each of the multiple industrial machines, ranges of wireless network communication of each of the multiple industrial machines, geographic positions of each of the multiple industrial machines, and distances between the multiple industrial machines.

12. The computer system of claim 8, further comprising:
identifying a change to one or more geographic positions of the multiple industrial machines; and
redeploying the one or more relay computing devices to different deployment locations within the activity area based on the identified change to one or more geographic positions of the multiple industrial machines.

13. The computer system of claim 8, further comprising:
identifying a change in the workflow; and
redeploying the one or more relay computing devices to different deployment locations within the activity area based on the identified change in the workflow.

14. The computer system of claim 8, further comprising:
identifying changes in data transfer rate among one or more of the multiple industrial machines;
identifying a priority of machine-to-machine communication among the multiple industrial machines; and
redeploying the one or more relay computing devices to different deployment locations within the activity area based on at least one of the identified changes in data transfer rate and the identified priority of machine-to-machine communication.

15. A computer program product, the computer program product comprising:
one or more computer-readable tangible storage medium and program instructions stored on at least one of the one or more tangible storage medium, the program instructions executable by a processor capable of performing a method, the method comprising:
identifying a workflow among multiple industrial machines within an activity area, wherein performance of the workflow requires wireless communication among the multiple industrial machines;
identifying communication requirements and communication capabilities of the multiple industrial machines;
in response to determining a wireless network is not available within the activity area, deploying one or more relay computing devices to deployment locations within the activity area based on the workflow, the communication requirements, and the communication capabilities; and
instructing the one or more relay computing devices to create a wireless network which enables wireless communication among the multiple industrial machines, wherein an amount of available bandwidth of the wireless network is based on an estimated volume of data transmission among the multiple industrial machines.

16. The computer program product of claim 15, wherein the workflow comprises a sequence of activities to be performed in collaboration by the multiple industrial machines and roles of the multiple industrial machines, and wherein identification of the workflow is based on a contextual analysis of an environment of the activity area.

17. The computer program product of claim 16, wherein identification of the communication requirements of the multiple industrial machines is based on the contextual analysis and the identified workflow, and wherein communication requirements of an industrial machine, of the multiple industrial machines, comprises identification of one or more other industrial machines, of the multiple industrial machines, with which communication is required and an estimated volume of data transmission.

18. The computer program product of claim 15, wherein the communication capabilities of the multiple industrial machines comprise wireless network communication capabilities of each of the multiple industrial machines, ranges of wireless network communication of each of the multiple industrial machines, geographic positions of each of the multiple industrial machines, and distances between the multiple industrial machines.

19. The computer program product of claim 15, further comprising:
identifying a change to one or more geographic positions of the multiple industrial machines; and
redeploying the one or more relay computing devices to different deployment locations within the activity area based on the identified change to one or more geographic positions of the multiple industrial machines.

20. The computer program product of claim 15, further comprising:
identifying a change in the workflow; and
redeploying the one or more relay computing devices to different deployment locations within the activity area based on the identified change in the workflow.

* * * * *